(12) United States Patent
Kinugasa

(10) Patent No.: US 11,549,896 B2
(45) Date of Patent: Jan. 10, 2023

(54) X-RAY FLUORESCENCE MEASUREMENT APPARATUS

(71) Applicant: JEOL Ltd., Tokyo (JP)

(72) Inventor: Genki Kinugasa, Tokyo (JP)

(73) Assignee: JEOL Ltd., Tokyo (JP)

(*) Notice: Subject to any disclaimer, the term of this patent is extended or adjusted under 35 U.S.C. 154(b) by 310 days.

(21) Appl. No.: 16/928,347

(22) Filed: Jul. 14, 2020

(65) Prior Publication Data

US 2021/0018453 A1   Jan. 21, 2021

(30) Foreign Application Priority Data

Jul. 18, 2019 (JP) .............................. JP2019-132751

(51) Int. Cl.
| | |
|---|---|
| *G01N 23/00* | (2006.01) |
| *G01N 23/223* | (2006.01) |
| *G01M 3/02* | (2006.01) |
| *G01N 23/2204* | (2018.01) |

(52) U.S. Cl.
CPC ............ *G01N 23/223* (2013.01); *G01M 3/02* (2013.01); *G01N 23/2204* (2013.01); *G01N 2223/076* (2013.01); *G01N 2223/507* (2013.01)

(58) Field of Classification Search
CPC ..... G01N 2223/076; G01N 2223/2204; G01N 23/223
See application file for complete search history.

(56) References Cited

U.S. PATENT DOCUMENTS

2006/0093086 A1* 5/2006 Gallagher .......... G01N 33/2835
                                                378/45
2012/0093300 A1   4/2012 Mann et al.

FOREIGN PATENT DOCUMENTS

| JP | H5052774 A | 3/1993 |
|---|---|---|
| JP | 8114562 A | 5/1996 |
| JP | 2001255289 A | 9/2001 |
| JP | 200524300 A | 1/2005 |
| JP | 2006317153 A | 11/2006 |
| JP | 2007524074 A | 8/2007 |
| JP | 5488632 B2 | 3/2014 |

OTHER PUBLICATIONS

Office Action issued in JP2019-132751 dated Aug. 3, 2021.

* cited by examiner

*Primary Examiner* — Dani Fox
(74) *Attorney, Agent, or Firm* — The Webb Law Firm

(57) ABSTRACT

An X-ray fluorescence measurement apparatus has a sample tank, and a measurement unit that has an X-ray generator and an X-ray fluorescence detector. A film mechanism takes out a used film from a partitioning position between the sample tank and the measurement unit in a slide direction which intersects a direction of arrangement of the sample tank and the measurement unit, and feeds an unused film portion to the partitioning position in the slide direction. The film portions may alternatively be exchanged using cassettes.

10 Claims, 6 Drawing Sheets

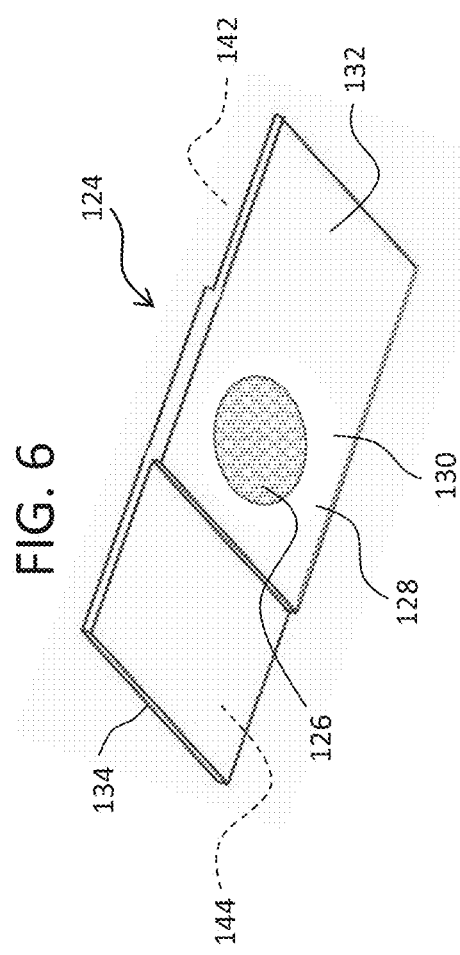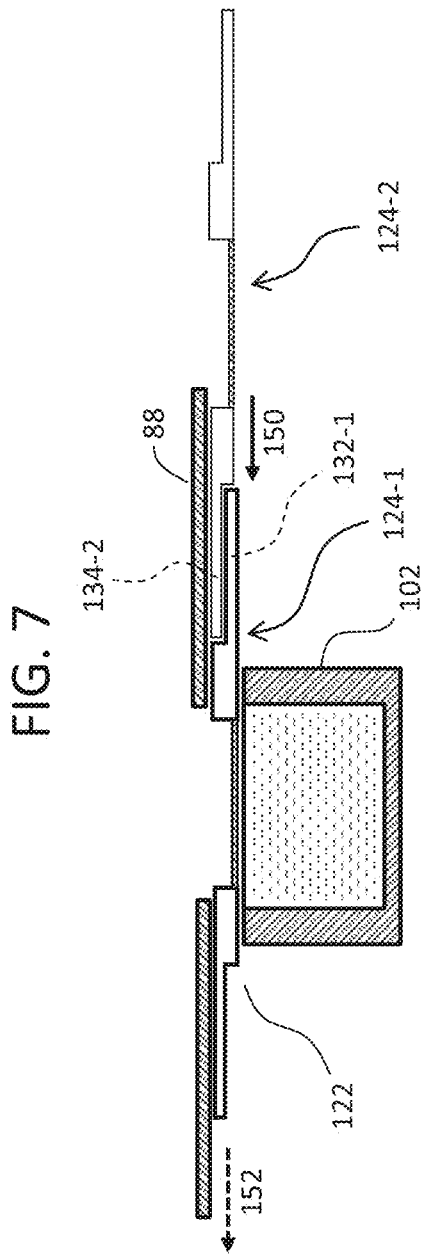

X-RAY FLUORESCENCE MEASUREMENT APPARATUS

CROSS REFERENCE TO RELATED APPLICATION

This application claims priority to Japanese Patent Application No. 2019-132751 filed Jul. 18, 2019, the disclosure of which is hereby incorporated by reference in its entirety.

BACKGROUND OF THE INVENTION

Field of the Invention

The present disclosure relates to an X-ray fluorescence measurement apparatus, and in particular to an X-ray fluorescence measurement apparatus which measures a liquid sample in a sample tank.

Description of Related Art

An X-ray fluorescence measurement apparatus is an apparatus in which an X-ray is irradiated onto a sample which is a measurement target, and the sample is measured or analyzed by detecting an X-ray fluorescence emitted from the sample. Because the X-ray fluorescence has an energy characteristic corresponding to a substance forming the sample, it is possible to identify a substance contained in the sample by identifying an energy of the X-ray fluorescence.

The X-ray fluorescence measurement apparatus comprises an X-ray generator and an X-ray detector. When a liquid sample is measured using the X-ray fluorescence measurement apparatus, a sample tank (sample cell) which houses the liquid sample, and a film which partitions the liquid sample and a measurement chamber are used.

JP 2006-317153 A discloses an X-ray fluorescence measurement apparatus comprising a film which functions as a bottom wall of the sample tank. The film is exchanged by a manual operation. JP H5-52774 A discloses an X-ray fluorescence measurement apparatus having a mechanism which feeds and winds up the film. A liquid drop of the liquid sample is dropped on the film, and is dry-processed, and then, the X-ray fluorescence analysis is executed for each individual liquid drop. The film does not function as a partition, but functions as a carrier of the sample.

In the X-ray fluorescence apparatus having the film which partitions the sample tank and the measurement chamber, a portion of the film experiencing the X-ray irradiation for a long period of time tends to be easily degraded. In addition, when the liquid sample has a corrosive characteristic, a portion of the film which is in contact with the liquid sample tends to be easily degraded. In the X-ray fluorescence measurement apparatus of the related art, the film cannot be exchanged in a state where the liquid sample is housed in the sample tank. If all of the exchange work of the film is to be executed by manual operation, burden for the worker becomes high.

SUMMARY OF THE INVENTION

An advantage of the present disclosure lies in enabling exchange of a film in a state in which the liquid sample is put in the sample tank in the X-ray fluorescence measurement apparatus. Alternatively, an advantage of the present disclosure lies in reduction of the burden for the worker in the film exchange operation in the X-ray fluorescence measurement apparatus.

According to one aspect of the present disclosure, there is provided an X-ray fluorescence measurement apparatus comprising: a sample tank that houses a liquid sample; a measurement unit that is provided adjacent to the sample tank, and that has an X-ray generator and an X-ray fluorescence detector; and a film mechanism that takes out a used film portion from a partitioning position between the sample tank and the measurement unit in a slide direction which intersects a direction of arrangement of the sample tank and the measurement unit, and that feeds an unused film portion to the partitioning position in the slide direction.

According to the structure described above, the used film portion is taken out from the partitioning position by the film mechanism or using the film mechanism, and the unused film portion is fed to the partitioning position by the film mechanism or using the film mechanism. With a simple operation or work of sliding, the taking-out and feeding of the film portion can be executed. Because the slide direction is a direction intersecting the direction of arrangement of the sample tank and the measurement unit, structures and placements of the sample tank and the measurement unit can be maintained during an exchange of the film portion. That is, exchange of the film portion can be executed while the liquid sample is put in the sample tank. The intersecting direction is desirably an orthogonal direction. In an embodiment, a plurality of film portions arranged in a horizontal direction intermittently move in the horizontal direction by the film mechanism.

According to another aspect of the present disclosure, the film mechanism simultaneously executes the taking-out of the used film portion and the feeding of the unused film portion. According to this structure, exchange of the film portion can be executed in a short period of time. A spatial relationship among the plurality of film portions is desirably determined so as to enable simultaneous execution of the taking-out process of the used film portion and the feeding process of the unused film portion.

According to another aspect of the present disclosure, a plurality of film portions are transported from an upstream side toward a downstream side in the slide direction, and each of the film portions becomes the unused film portion and the used film portion. According to this structure, exchange of the film portions can be executed in a simple manner. The transport of the plurality of film portions may be executed automatically or by a manual operation.

According to another aspect of the present disclosure, the film mechanism is a mechanism which stepwise transports a long-length film from the upstream side toward the downstream side in the slide direction, and the plurality of film portions are created on the long-length film by the stepwise transporting of the long-length film. According to this structure, the transporting of the plurality of film portions can be facilitated. In addition, handleability of the plurality of film portions can be improved.

According to another aspect of the present disclosure, the long-length film forms a bottom or a ceiling of the sample tank. A seal member for preventing leakage of the liquid sample from the sample tank is used as necessary. According to another aspect of the present disclosure, the X-ray fluorescence measurement apparatus further comprises a capture structure that is provided at a periphery of the sample tank, and that captures a liquid sample which has leaked out from the sample tank. According to another aspect of the present disclosure, the X-ray fluorescence measurement apparatus further comprises an adjustment mechanism that adjusts a liquid surface level of the sample tank. The liquid surface level may be adjusted mechanically or physically, or adjusted electrically.

According to another aspect of the present disclosure, the film mechanism comprises a plurality of cassettes which are used in sequence, each of the cassettes includes a film portion and a frame which retains the film portion, and the film portion in each of the cassettes becomes the unused film portion and the used film portion. According to this structure, handling and exchange of each individual film portion may be facilitated.

According to another aspect of the present disclosure, the frame of each of the cassettes has a one-side structure and an other-side structure, the plurality of cassettes include a first cassette and a second cassette which are used consecutively, and the one-side structure of the first cassette and the other-side structure of the second cassette engage each other. According to this structure, ejection of the cassette can be executed reliably and easily.

According to another aspect of the present disclosure, the slide direction is a direction along a direction of arrangement of the X-ray generator and the X-ray fluorescence detector. According to this structure, a size of the apparatus can be easily reduced.

BRIEF DESCRIPTION OF THE DRAWINGS

Embodiment(s) of the present disclosure will be described based on the following figures, wherein:

FIG. 6 is a perspective diagram of a cassette; and

FIG. 7 is a diagram showing an operation during exchange of cassettes.

DESCRIPTION OF THE INVENTION

An embodiment of the present disclosure will now be described with reference to the drawings.

Figure 1:
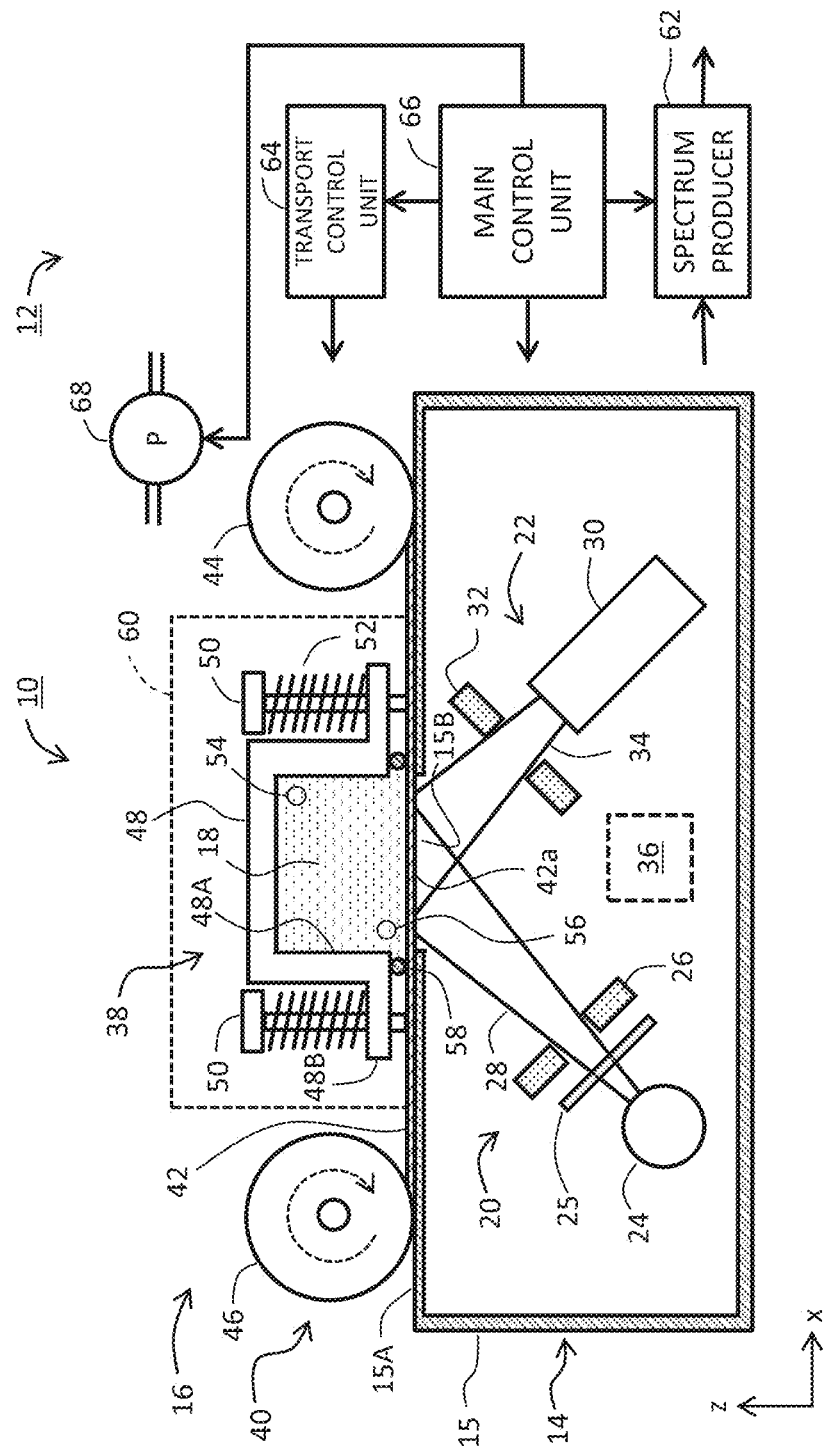
FIG. 1 is a diagram showing a first example structure of an X-ray fluorescence measurement apparatus according to an embodiment of the present disclosure.

FIG. 1 shows a first example structure of an X-ray fluorescence measurement apparatus according to an embodiment of the present disclosure. The X-ray fluorescence measurement apparatus is an apparatus which measures a spectrum of an X-ray fluorescence emitted from a substance contained in a liquid sample. It is possible to identify or quantitate the substance by analyzing the spectrum. In the figures, a first horizontal direction is an x direction, a second horizontal direction is a y direction, and a vertical direction is a z direction.

In FIG. 1, the X-ray fluorescence measurement apparatus comprises a measurement section 10 and a calculation control section 12. The measurement section 10 has a lower part 14 and an upper part 16 which are adjacent to each other. The lower part 14 functions as a measurement unit. The upper part 16 has a storage structure 38 and a film mechanism 40. The lower part 14 has a housing 15. A ceiling wall 15A of the housing 15 functions as a partition wall between the lower part 14 and the upper part 16. An opening 15B for passing an X-ray is formed on the ceiling wall 15A. The storage structure 38 has a sample tank 48 which stores a sample. A liquid sample 18 which is an analysis target is housed inside the sample tank 48.

An X-ray irradiation unit 20 and an X-ray fluorescence detection unit 22 are placed in the housing 15. The X-ray irradiation unit 20 irradiates an X-ray beam 28 onto the liquid sample 18 from a first slanted direction. The X-ray irradiation unit 20 comprises an X-ray generator 24, a primary filter 25, and a collimator 26. Of the X-rays generated by the X-ray generator 24, a particular energy component is reduced by the primary filter 25. A shape of the X-ray which has passed through the primary filter 25 is adjusted by the collimator 26. With this process, the X-ray beam 28 is formed into a cone shape. Alternatively, a plurality of primary filters may be provided, and a primary filter to be actually used may be selected from these filters. Alternatively, a plurality of openings having different sizes from each other may be formed with respect to the collimator 26, and an opening to be actually used may be selected from these openings. The X-ray beam 28 passes through the opening 15B and a film 42 to be described later, and reaches a surface layer of the liquid sample 18. With this process, an X-ray fluorescence is generated from a substance contained in the surface layer.

The X-ray fluorescence detection unit 22 detects an X-ray fluorescence emitted from the liquid sample 18 in a second slanted direction. The X-ray fluorescence detection unit 22 comprises a collimator 32 and an X-ray detector 30. An opening is formed on the collimator 32, and a shape of the X-ray fluorescence reaching the X-ray detector 30 is defined by the opening. That is, an X-ray fluorescence beam 34 is formed by the collimator 32. Alternatively, a secondary filter may be added to the X-ray fluorescence detection unit 22. The X-ray fluorescence beam 34 also has a conical shape.

The first slanted direction and the second slanted direction are in an xz plane. For example, the first slanted direction is inclined by −45 degrees with respect to the z direction, and the second slanted direction is inclined by +45 degrees with respect to the z direction. A direction of arrangement of the X-ray irradiation unit 20 and the X-ray fluorescence detection unit 22; that is, a direction of arrangement of the X-ray generator 24 and the X-ray detector 30, is in the x direction. Alternatively, a camera 36 may be provided for observing the film 42 through the opening 15B.

As described above, the upper part 16 has the storage structure 38 and the film mechanism 40. The storage structure 38 has the sample tank 48 and a plurality of pressing devices 50. The sample tank 48 has a body 48A having a tubular shape, and a flange 48B having a brim shape, connected at a lower part of the body 48A. The liquid sample 18 is housed inside the sample tank 48. Each of the plurality of pressing devices 50 has a support, a fixation end, and a spring. The spring is placed between the fixation end and the flange 48B. The spring applies a downward elastic force to the sample tank 48. That is, the sample tank 48 is pressed toward the side of the film 42. The sample tank 48 has an opening 54 for introducing the liquid sample 18 and an opening 56 for discharging the liquid sample 18.

An O-ring 58 serving as a seal member formed from an elastic material is provided between the film 42 and the flange 48B. A diameter of the O-ring 58 is larger than a diameter of the opening 15B, and is smaller than an inner size of the body 48A. With the O-ring 58, flowing-out of the liquid sample 18 is prevented. A pressing force produced by a plurality of the springs is applied to the O-ring 58. Alternatively, a plurality of O-rings may be placed in a multiplexed manner as necessary. Alternatively, a cover 60 covering the storage structure 38 may be provided.

The film mechanism 40 is a mechanism which transports the film 42 which is a long-length member, and comprises a feed roller 44 and a wind-up roller 46. In an initial stage, the film 42 is wound around the feed roller 44. The film 42 fed from the feed roller 44 is wound around the wind-up roller. The film 42 is formed from, for example, a resin material, and a thickness thereof is, for example, about a few μm. Desirably, the material and the thickness of the film 42 are determined such that attenuation of the X-ray does not significantly occur in the film 42. In addition, desirably, a chemically stable structure which is resistant against chemicals is used as the film 42.

In FIG. 1, the film 42 is transported from a right side to a left side. Between the two rollers 44 and 46, the film 42 moves in a sliding manner along an upper surface of the ceiling wall 15A while contacting the upper surface thereof. Desirably, in order to prevent slack in the film 42, there is provided a mechanism which applies a tension to the film 42. A location between the sample tank 48 and the measurement unit, more specifically, between the sample tank 48 and the opening 15B, is a partitioning position, and at this location, a partitioning function or an isolating function is realized by a part of the film 42.

Next, the calculation control section 12 will be described. The calculation control section 12 is formed from, for example, an information processor. The information processor comprises a processor which executes a program. The processor functions as a spectrum producer 62, a transport control unit 64, and a main control unit 66, which will be described below.

The spectrum producer 62 produces an X-ray fluorescence spectrum based on an X-ray detection signal. A substance contained in the sample is identified by analyzing the X-ray fluorescence spectrum; more specifically, from an energy of a characteristic X-ray peak included in the spectrum. An amount of the substance is identified from a level or an area of the characteristic X-ray peak. A result of the spectrum analysis is displayed on a display (not shown).

The transport control unit 64 controls the transporting of the film. In the present embodiment, the film 42 is intermittently transported with a certain time interval. An element of the film 42 which actually functions is a plurality of film portions 42a. A location between the sample tank 48 and the measurement unit is the partitioning position, and the film portion is set at this position. In other words, a portion which is in contact with the liquid sample 18 or a portion onto which the X-ray is irradiated during the measurement is the film portion 42a. Each film portion 42a is an unused film portion before the measurement and is a used film portion after the measurement.

The main control unit 66 controls operations of the X-ray generator 24 and the X-ray detector 30, and also controls the transporting of the film through control of the transport control unit 64. In addition, the main control unit 66 controls transporting of the liquid sample through control of a pump 68. In the present embodiment, there are two measurement modes. Specifically, one is a mode in which the liquid sample is measured in a static storage state of the liquid sample in which the liquid sample is not allowed to flow, and another is a mode in which the liquid sample is measured while the liquid sample is allowed to slowly flow.

Figure 2:
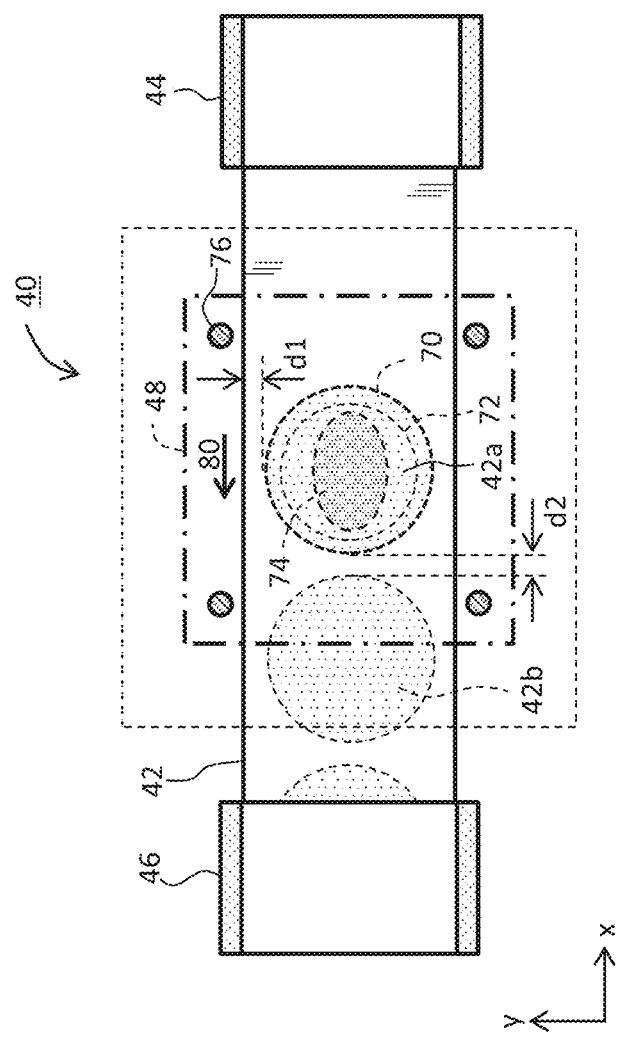
FIG. 2 is a diagram showing an upper surface of a film mechanism.

FIG. 2 shows an upper surface of the film mechanism 40. As already described, the film mechanism 40 comprises the feed roller 44 and the wind-up roller 46. The sample tank 48 is retained by four pressing devices. In FIG. 2, a cross section 76 of a support of each pressing device is shown. Reference numeral 70 shows a position where an O-ring is placed. During the measurement, the liquid sample contacts the film portion 42a which is an inner side region of the O-ring. Depending on properties of the liquid sample, the film portion 42a may be degraded due to continued contact with the liquid sample. A mechanism for exchanging the film portion 42a is the film mechanism 40. Reference numeral 72 indicates an inner surface of a body of the sample tank. An elliptical region 74 is a region onto which the X-ray is irradiated. The region 74 is also a portion where the degradation may be caused due to the irradiation of the X-ray.

In the illustrated example configuration, after every measurement for a certain time period, the film portion 42a is switched. A film portion 42b is a film portion used in a previous measurement. The film portion 42b is thus a used film portion. Although not shown, a film portion to be used next may be conceptualized at a near side of the film portion 42a, which is an unused film portion. On the film 42, margins d1 are set as margins at respective sides of each film portion. Similarly, a margin d2 is set as a margin between adjacent partial regions. Reference numeral 80 indicates a feeding direction of the film 42.

Figure 3:
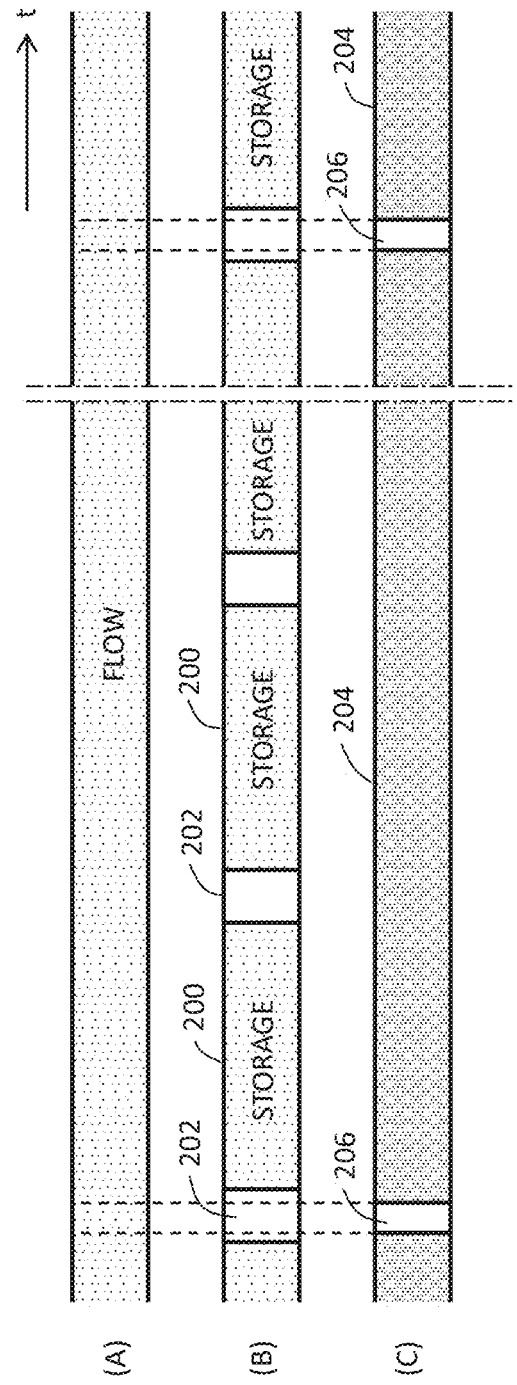
FIG. 3 is a diagram showing an operation of an X-ray fluorescence measurement apparatus.

FIG. 3 shows an example operation. Illustration (A) shows a first operation mode. In the first operation mode, the liquid sample in the sample tank is continuously measured while supply of the liquid sample to the sample tank and the discharge of the liquid sample from the sample tank are continuously executed. Illustration (B) shows a second operation mode. In the second operation mode, the liquid sample is stored in the sample tank, and the liquid sample in the sample tank is measured while this state is maintained (without allowing the liquid sample to flow). Reference numeral 200 indicates a storage period, and the measurement is executed during the storage period. Reference numeral 202 indicates a period in which the liquid sample is exchanged. In this period, the measurement is not executed. Alternatively, the period 202 in which the measurement is not executed may be practically defined by discarding or removing unnecessary data while the X-ray irradiation and the X-ray detection are continuously executed.

Illustration (C) shows a film transporting operation. Reference numeral 204 indicates a stop period in which the film is not moved. A transport period 206 is a period in which the film portion is exchanged. During the transport period 206, the measurement is not executed. During the execution of the second operation mode, the period 202 in which the liquid sample is exchanged and the transport period 206 are determined such that the periods entirely or partially overlap each other. In other words, an exchange timing of the liquid sample and a transport timing of the film are adjusted such that simultaneity is secured between these timings. With such a configuration, wastefulness in the measurement can be minimized. In FIG. 3, the period 202 is longer than the transport period 206, but alternatively, the period 202 may be shorter than the transport period 206.

According to the above-described embodiment, the film portion in contact with the liquid sample or the film portion onto which the X-ray is irradiated can be periodically exchanged in a simple and quick manner. Because a long-length film is used, efforts for maintenance can be reduced. As the film portion forms a bottom of the sample tank, there is another advantage in that a measurement target surface can be stabilized or flattened.

Figure 4:
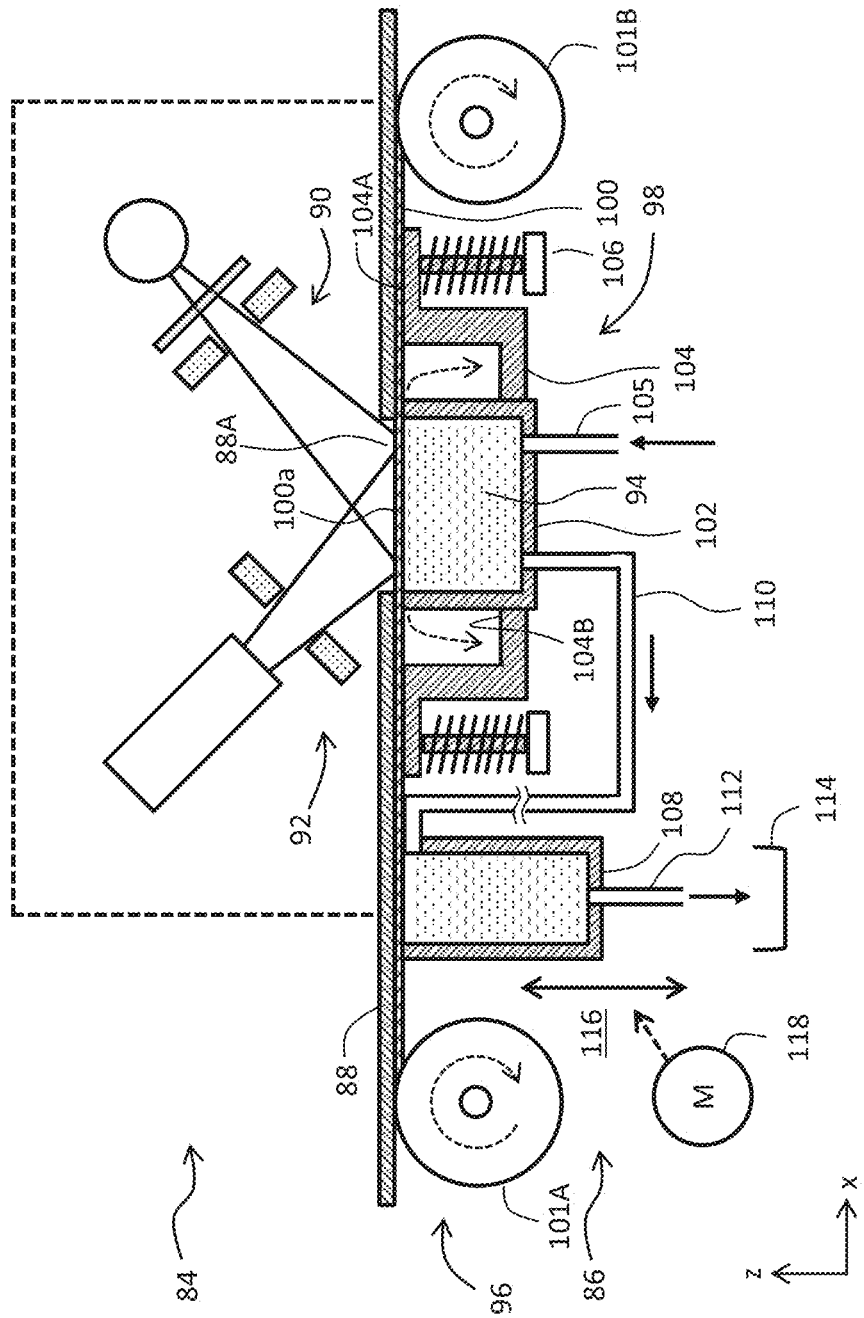
FIG. 4 is a diagram showing a second example structure of an X-ray fluorescence measurement apparatus according to an embodiment of the present disclosure.

FIG. 4 shows a second example structure of an X-ray fluorescence measurement apparatus according to an embodiment of the present disclosure. FIG. 4 shows a measurement section 82, of the X-ray fluorescence measurement apparatus, which has an upper part 84 and a lower part 86. The calculation control section is not shown in FIG. 4.

The upper part 84 functions as a measurement unit. The lower part 86 includes a storage structure 98 and a film mechanism 96. A partition wall 88 is provided between the upper part 84 and the lower part 86. An opening 88A for allowing an X-ray to pass is formed in the partition wall 88. The upper part 84 has an X-ray irradiation unit 90 and an X-ray fluorescence detection unit 92. The X-ray irradiation unit 90 has a structure similar to that of the X-ray irradiation unit shown in FIG. 1. The X-ray fluorescence detection unit 92 also has a structure similar to that of the X-ray fluorescence detection unit shown in FIG. 1.

The storage structure 98 comprises a sample tank 102 and a capture structure 104. A liquid sample 94 is housed inside the sample tank 102. The capture structure 104 has a form surrounding the sample tank 120 having a circular tubular shape, and has an annular groove 104B for capturing the liquid sample flowing out from the sample tank 102. The capture structure 104 has a flange 104A having a brim shape, and an urging force produced by a plurality of pressing devices 106 is applied on the flange 104A.

A pipe 105 is connected to the sample tank 102. The liquid sample is introduced into the sample tank 102 through the pipe 105. An auxiliary tank 108 is provided adjacent to the sample tank 102. The sample tank 102 and the auxiliary tank 108 are connected to each other by a pipe 110. The inside of the sample tank 102 and the inside of the auxiliary tank 108 are in communication with each other through the pipe 110. A liquid surface level of the sample tank 102 and a liquid surface level of the auxiliary tank 108 are thus equal to each other. An elevating/lowering mechanism 116 is a mechanism which controls a position of the auxiliary tank 108 in an up-and-down direction, to thereby change the liquid surface level in the auxiliary tank 108. The elevating/lowering mechanism 116 has a motor 118 serving as a drive source, and an operation thereof is controlled by the main control unit.

Alternatively, the liquid surface level in the sample tank 102 may be controlled by a means other than the elevating/lowering mechanism 116. For example, an amount of liquid in the sample tank 102 may be adjusted by control of a pump, an electromagnetic valve, or the like. A pipe 112 is connected to the auxiliary tank 108. An electromagnetic valve is provided on the pipe 112, but is not shown in the figures. The liquid sample discharged from the auxiliary tank 108 through the pipe 112 is collected by a drain 114.

The film mechanism 96 has a structure similar to that of the film mechanism shown in FIGS. 1 and 2. Specifically, the film mechanism 96 comprises a feed roller 101A and a wind-up roller 101B. A film 100 extends horizontally along a lower surface of the partition wall 88, between the rollers. A transport direction of the film 100; that is, the slide direction, is the x direction. Similar to the first example structure, the x direction is a direction intersecting, more specifically, orthogonal to, the direction of arrangement of the measurement unit and the sample tank 102 (z direction).

The liquid sample 94 in the sample tank 102 is in contact with the film 100. A portion 100a of the film 100 in contact with the liquid sample 94 is a portion to be exchanged; that is, a film portion. The film portion 100a has a circular shape. The film portion 100a is an unused film portion before the measurement, and is a used film portion after the measurement. A plurality of film portions along the slide direction can be conceptualized on the film 100.

In the second example structure, the film portion 100a forms a ceiling of the sample tank 102, and separates or partitions an upper surface of the sample tank 102. A surface of the liquid sample 94 is flattened and stabilized by the film 100. In addition, mixing of foreign objects into the liquid sample 94 is prevented by the film portion 100a. In the second example structure also, a seal member is desirably provided at locations where sealing is necessary. In the second example structure, because the upper surface level of the liquid sample 94 is always set constant, occurrence of a measurement error due to variation of the upper surface level can be prevented or reduced. In the second example structure also, the first operation mode and the second operation mode described above are selectively applied.

Figure 5:
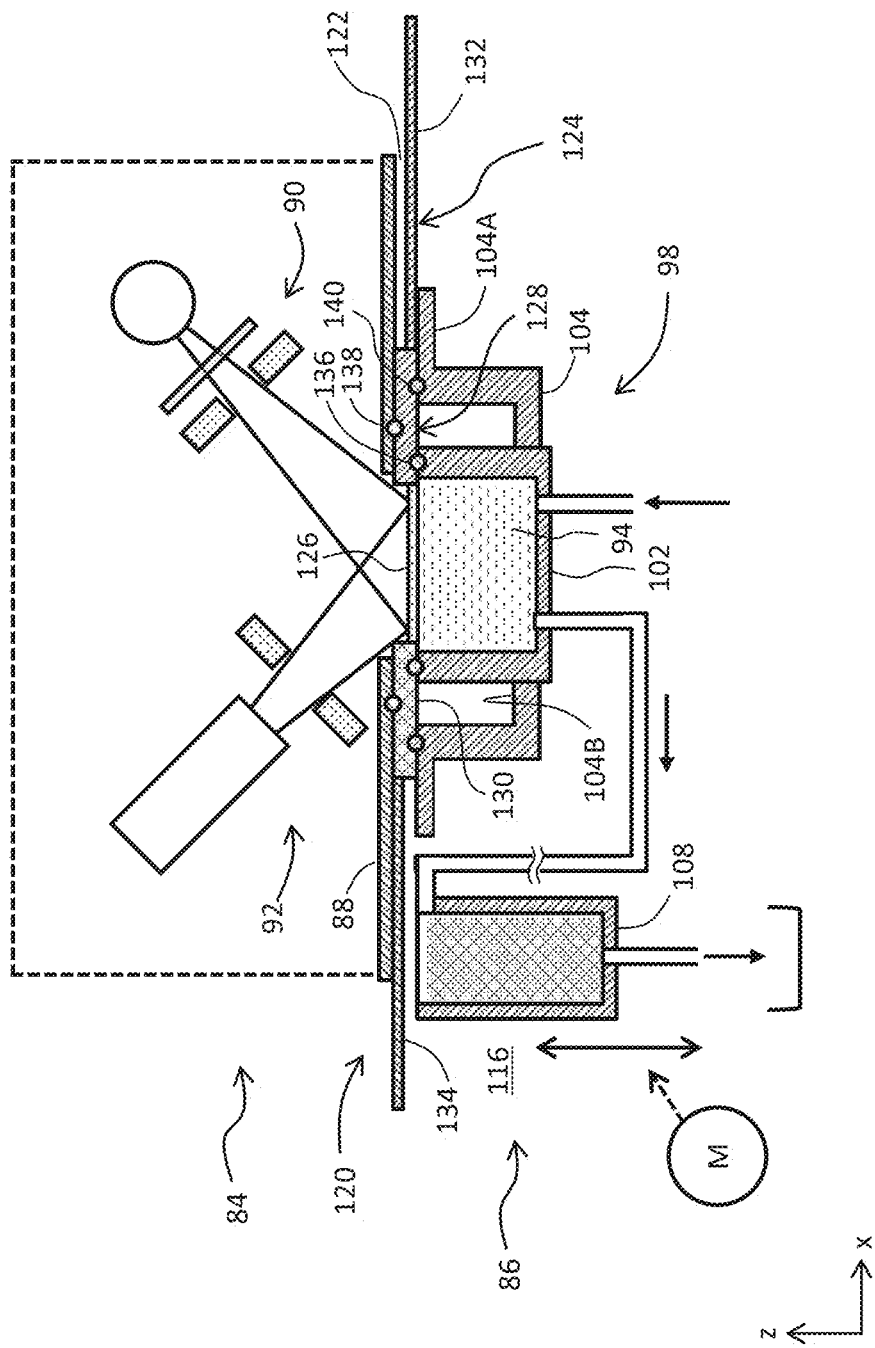
FIG. 5 is a diagram showing a third example structure of an X-ray fluorescence measurement apparatus according to an embodiment of the present disclosure.

FIG. 5 shows a third example structure. In the third example structure, as will be described below in detail, a plurality of cassettes 124 are used. Structures similar to those shown in FIG. 4 are assigned the same reference numerals, and will not be described again.

A film mechanism 120 is formed from a horizontal slit 122 and the plurality of cassettes 124 sequentially inserted into the slit 122. The slit 122 is a passage or a groove which extends in a horizontal direction, between the partition wall 88 and the sample tank 102. More specifically, the slit 122 penetrates through in the x direction and is closed in the y direction and the z direction. In FIG. 5, one cassette 124 is inserted into the slit 122. The cassette 124 has an approximate flat plate shape as a whole. The cassette 124 has a film 126 and a frame 128 attached to the film 126. The film 126 is formed from a resin member having flexibility, and the frame 128 is formed from, for example, a hard resin material. From the viewpoint of the film 126 as a portion to be exchanged, the film 126 may also be called a film portion.

The frame 128 comprises a holder 130, a first plate 132 provided on one side of the holder 130, and a second plate 134 provided on the other side of the holder 130. The first plate 132 and the second plate 134 have the same thickness, which is ½ of a thickness of the holder 130. The first plate 132 is provided at a position biased toward a lower side with respect to the holder 130, and the second plate 134 is provided biased toward an upper side with respect to the holder 130.

Alternatively, the holder 130, the first plate 132, and the second plate 134 may be integrated. That is, the frame 128 may be formed as a single member. In FIG. 5, when a direction from a right side toward a left side is the slide direction, an upstream side thereof is a near side, and a downstream side thereof is a far side, the first plate 132 functions as a near-side structure, and the second plate 134 functions as a far-side structure. Alternatively, it is possible to employ a configuration where the direction of the cassette exchange can be switched.

In the illustrated example structure, assuming a slide motion from the right side to the left side, when a number n is 1, 2, 3, . . . , during the cassette exchange, the second plate of an (n+1)th unused cassette engages the first plate of an (n)th used cassette. In this engaged state, an end surface of the first plate of the unused cassette contacts the holder of the used cassette, and an end surface of the first plate of the used cassette contacts the holder of the unused cassette. In addition, in this engaged state, a thickness of a combined structure of the first plate and the second plate which are overlapped becomes equal to the thickness of the holder.

An O-ring 136 is provided on an upper surface of the sample tank 102, an O-ring 138 is provided on a lower surface of the partition wall 88, and an O-ring 140 is provided on an upper surface of the flange 104A. These O-rings 136, 138, and 140 function as seal members, for preventing or reducing leakage of the liquid sample. More specifically, the O-ring 136 realizes the sealing function between the upper surface of the sample tank 102 and a lower surface of the cassette 124 (a lower surface of the holder 130 and a lower surface of the first plate 132). The O-ring 138 realizes the sealing function or an elastic function between the lower surface of the partition wall 88 and an upper surface of the cassette 124 (an upper surface of the holder 130 and an upper surface of the second plate 134). The O-ring 140 realizes the sealing function between the upper surface of the flange 104A and the lower surface of the cassette 124 (the lower surface of the holder 130 and the lower surface of the first plate 132). Alternatively, a sealing structure other than the illustrated sealing structure may be employed.

A circular opening is formed at a central part of the holder 130, and the film 126 having a circular shape is placed in the opening. In the illustrated example configuration, a lower surface level of the film 126 and a lower surface level of the holder 130 are matched. The lower surface of the film 126 separates the upper surface of the liquid sample 94 and is in close contact with the upper surface. A volume of the liquid sample 94 is adjusted or the liquid surface level of the liquid sample 94 is adjusted so as to cause such a close contact.

An X-ray is irradiated onto a surface layer of the liquid sample 94 through the film 126, and an X-ray fluorescence generated in the substance in the surface layer is detected. When the film is degraded, the film is exchanged by a method of cassette exchange. That is, the used film is exchanged with an unused film. In this case, it is not necessary to discharge the liquid sample from the sample tank 102 to empty the sample tank 102. The film can be exchanged while the sample tank 102 is fixed. Because the film is retained by a hard frame, the film can be easily handled.

FIG. 6 shows the cassette 124, viewed from a slanted lower side. As described above, the cassette 124 is formed from the film 126 and the frame 128, and the frame 128 is formed from the holder 130, the first plate 132, and the second plate 134. A step is formed between the holder 130 and the first plate 132, and an upper surface 142 of the first plate 132 contacts the step. Another step is formed between the holder 130 and the second plate 134, and a lower surface 144 of the second plate 134 contacts the step.

FIG. 7 shows an operation during cassette exchange. A first cassette 124-1 is placed in the slit 122 between the sample tank 102 and the partition wall 88. As shown by reference numeral 150, a second plate 134-2 of a second cassette 124-2 is inserted at an upper side of a first plate 132-1 of the first cassette 124-1, to form an engaged state of the two cassettes 124-1 and 124-2. In this engaged state, the second cassette 124-2 is pressed. With this process, as shown by reference numeral 152, the first cassette 124-1 is pushed out from the slit 122, and the second cassette 124-2 is inserted into the slit 122 in place of the first cassette 124-1.

In the third example structure, because a hard frame is provided at a periphery of the film, workability during exchange of the film can be improved. Alternatively, the transporting of the cassette may be automated. Alternatively, the transporting of the cassette may be executed by a manual operation. Alternatively, a cassette exchange by sliding from one side and a cassette exchange by sliding from the other side may both be employed. Alternatively, the whole or a part of the storage structure may be moved upward and downward, to increase a height of the slit before exchange of the cassette, and the height of the slit may then be reduced after the exchange of the cassette.

The invention claimed is:

1. An X-ray fluorescence measurement apparatus comprising:
   a sample tank that houses a liquid sample;
   a measurement unit that is provided adjacent to the sample tank, and that has an X-ray generator and an X-ray fluorescence detector;
   a film mechanism that takes out a used film portion from a partitioning position between the sample tank and the measurement unit in a slide direction which intersects a direction of arrangement of the sample tank and the measurement unit, and that feeds an unused film portion to the partitioning position in the slide direction; and
   a capture structure that is provided at a periphery of the sample tank, and that captures a liquid sample which has leaked out from the sample tank.

2. The X-ray fluorescence measurement apparatus according to claim 1, wherein
   the film mechanism simultaneously executes taking-out of the used film portion and feeding of the unused film portion.

3. The X-ray fluorescence measurement apparatus according to claim 1, wherein
   a plurality of film portions are transported from an upstream side toward a downstream side in the slide direction, and
   each of the film portions becomes the unused film portion and the used film portion.

4. The X-ray fluorescence measurement apparatus according to claim 3, wherein
   the film mechanism is a mechanism which stepwise transports a long-length film from the upstream side toward the downstream side in the slide direction, and
   the plurality of film portions are created on the long-length film by the stepwise transporting of the long-length film.

5. The X-ray fluorescence measurement apparatus according to claim 4, wherein
   the long-length film forms a bottom or a ceiling of the sample tank.

6. The X-ray fluorescence measurement apparatus according to claim 1, further comprising:
   an adjustment mechanism that adjusts a liquid surface level of the sample tank.

7. An X-ray fluorescence measurement apparatus comprising:
   a sample tank that houses a liquid sample;
   a measurement unit that is provided adjacent to the sample tank, and that has an X-ray generator and an X-ray fluorescence detector; and
   a film mechanism that takes out a used film portion from a partitioning position between the sample tank and the measurement unit in a slide direction which intersects a direction of arrangement of the sample tank and the measurement unit, and that feeds an unused film portion to the partitioning position in the slide direction, wherein
   the film mechanism comprises a plurality of cassettes which are used in sequence,
   each of the cassettes includes a film portion and a frame which retains the film portion, and
   the film portion in each of the cassettes becomes the unused film portion and the used film portion.

8. The X-ray fluorescence measurement apparatus according to claim 7, wherein
the frame of each of the cassettes has a one-side structure and an other-side structure,
the plurality of cassettes include a first cassette and a second cassette which are consecutively used, and
the one-side structure of the first cassette and the other-side structure of the second cassette engage each other.

9. The X-ray fluorescence measurement apparatus according to claim 1, wherein
the slide direction is a direction along a direction of arrangement of the X-ray generator and the X-ray fluorescence detector.

10. An X-ray fluorescence measurement apparatus comprising:
a sample tank that houses a liquid sample;
a measurement unit that is provided adjacent to the sample tank on an upper side thereof, and that has an X-ray generator and an X-ray fluorescence detector;
a film mechanism that takes out a used film portion from a partitioning position between the sample tank and the measurement unit in a slide direction which intersects a direction of arrangement of the sample tank and the measurement unit, and that feeds an unused film portion to the partitioning position in the slide direction;
an auxiliary tank, an inside of which is in communication with an inside of the sample tank; and
an elevating/lowering mechanism that controls a position of the auxiliary tank in an up-and-down direction, to thereby change a liquid surface level in the sample tank.

\* \* \* \* \*